United States Patent [19]

Stanley

[11] Patent Number: 5,082,027
[45] Date of Patent: Jan. 21, 1992

[54] HOSE ROTATION RESTRAINER

[75] Inventor: John H. Stanley, Uniontown, Ohio

[73] Assignee: The Goodyear Tire & Rubber Company, Akron, Ohio

[21] Appl. No.: 420,510

[22] Filed: Oct. 13, 1989

[51] Int. Cl.[5] .......................... F16L 9/18; B65B 3/18
[52] U.S. Cl. .................................... 138/113; 138/103; 138/108; 138/110; 141/45; 141/59; 141/302
[58] Field of Search ............... 138/103, 108, 110, 118, 138/178, 113, 148, 111, 112, 114; 141/44, 45, 59, 302; 137/375, 343, 123, 153

[56] References Cited

U.S. PATENT DOCUMENTS

| | | | |
|---|---|---|---|
| 1,935,999 | 11/1933 | Tessky | 138/108 |
| 2,915,089 | 12/1959 | Hopsting | 138/113 |
| 4,100,758 | 7/1978 | Mayer | 141/45 |
| 4,250,927 | 2/1981 | Newburg | 138/113 |
| 4,274,549 | 6/1981 | Germain | 138/113 |
| 4,440,154 | 4/1984 | Bellows | 138/108 |
| 4,566,501 | 1/1986 | Furrow et al. | 141/45 |
| 4,570,686 | 2/1986 | Devine | 138/113 |
| 4,687,033 | 8/1987 | Furrow et al. | 141/59 |
| 4,842,027 | 6/1989 | Faeth | 141/302 |
| 4,951,720 | 8/1990 | Grantham | 141/302 |

Primary Examiner—James E. Bryant, III
Attorney, Agent, or Firm—Marc R. Dion, Sr.

[57] ABSTRACT

A hose rotation restrainer which attaches to the inner product hose of a coaxial vapor recovery hose assembly along with the inlet end of a suction tube in the vapor passageway between the inner product hose and the outer hose to prevent rotation of the product hose in order to maintain the end of the suction tube at a low point in the catenary of the hose assembly for removing liquid accumulations.

4 Claims, 1 Drawing Sheet

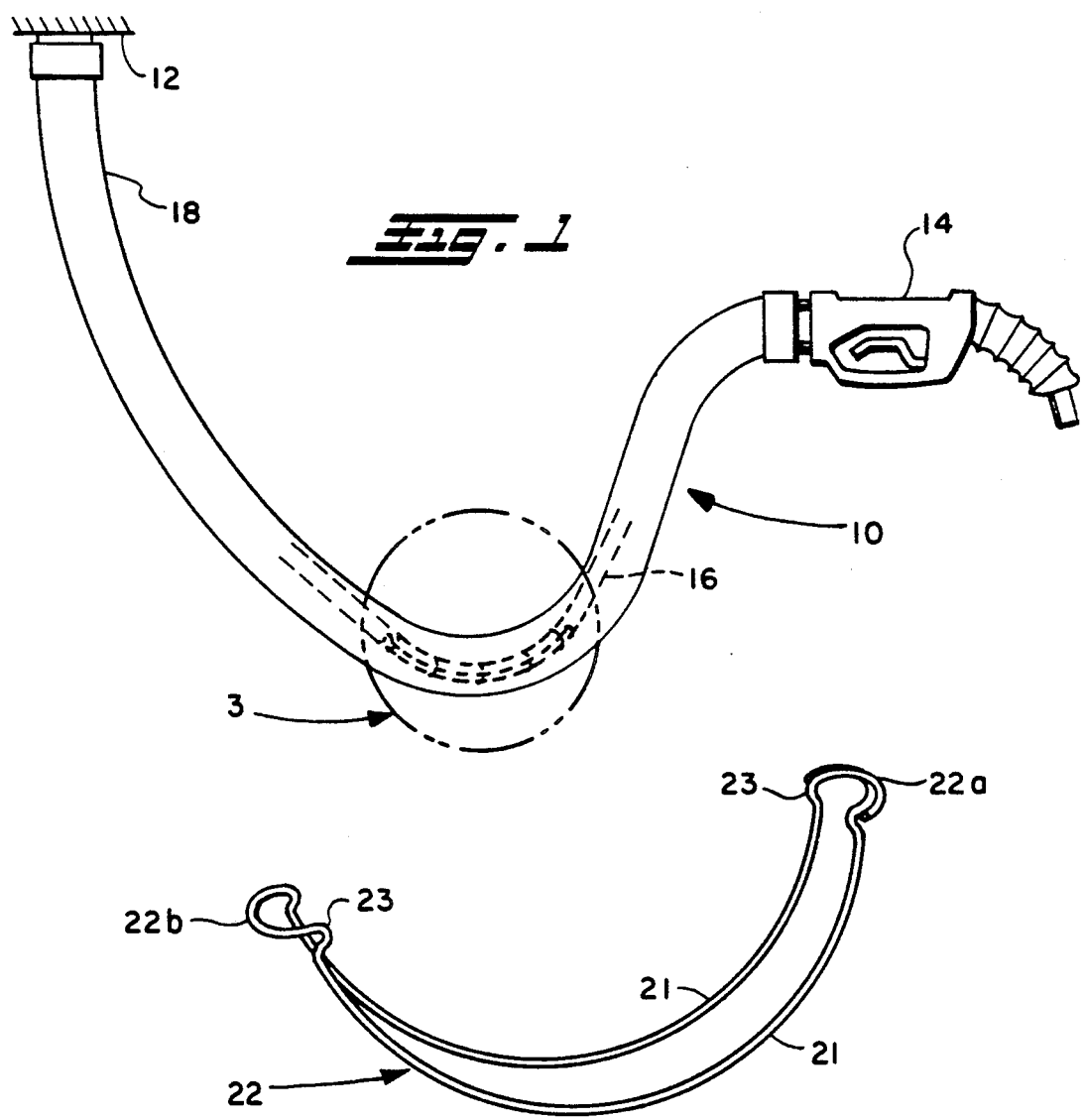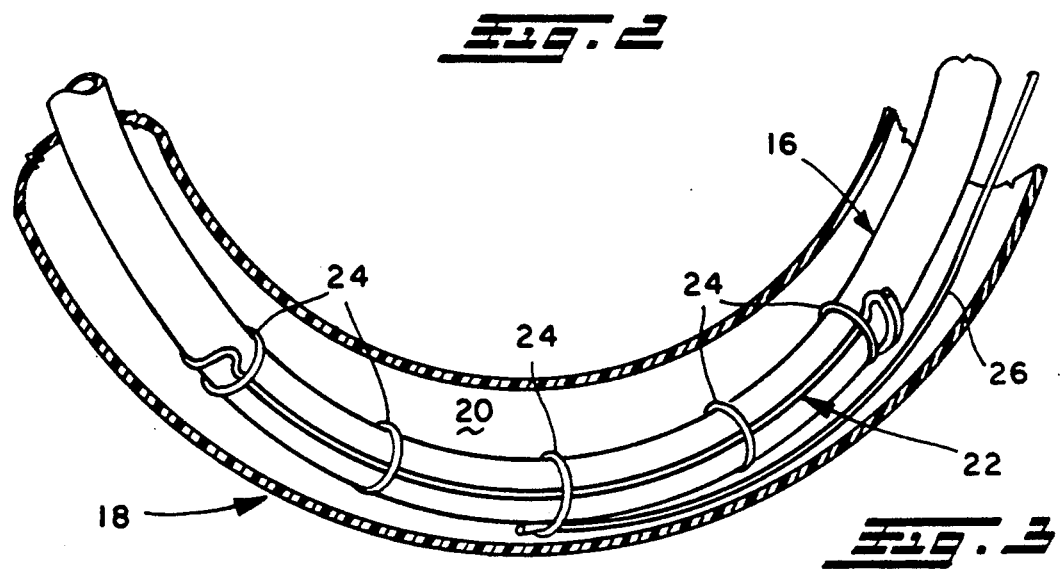

HOSE ROTATION RESTRAINER

FIELD OF THE INVENTION

This invention relates to coaxial vapor recovery hose assemblies. More particularly, it relates to a hose rotation restrainer.

BACKGROUND OF THE INVENTION

The use of coaxial vapor recovery hose assemblies for delivering fuel from a pump stand to a valved nozzle for refueling motor vehicles has been known for many years. More recently, such vapor recovery hose assemblies have included a means for sucking any accumulated liquid from a low point in the catenary of the hose assembly resulting from splashback or a collection of condensed vapors. Such means for sucking the liquid generally includes a Venturi pump which operates through the passage of the fuel product through the Venturi to create a suction at an orifice connected to the Venturi throat. A suction tube is connected to the orifice with the other end of the suction tube located at the low point in the catenary of the hose assembly in the vapor passageway between the product hose and the outer hose and is generally attached to the product hose on the bottom in order to be located where any liquid would accumulate.

In order to assure that the suction tube remains at such a low point while attached to the product hose, it is necessary to assure that the product hose does not rotate within the vapor passageway. It is therefore an object of the present invention to provide a hose rotation restrainer which, when attached to the inner product hose of a coaxial vapor recovery hose assembly, will prevent the rotation of the inner product hose.

It is also an object of the present invention to provide an assembly utilizing the hose rotation restrainer which also encompasses attaching the suction tube to the low point in the catenary of the hose while the hose is being used in the refueling operation.

SUMMARY OF THE INVENTION

In accordance with the practice of the present invention, there is provided in a coaxial vapor recovery hose assembly having an inner product hose having an outer radius and an outer diameter, an outer hose coaxially surrounding the product hose and defining therewith an annular vapor passageway therebetween and a suction tube which extends to a low point of the catenary of the hose assembly while in use, a cradle-shaped hose rotation restrainer attached to the product hose at the low point and comprising a pair of arcuate, parallel members having inwardly extending loops at each end of the members and connected at each end thereof by a semicircular loop having a radius equal to the outer radius of the product hose, the members being spaced apart a distance equal to the outer diameter of the product hose. There is also provided a coaxial vapor recovery hose assembly comprising an inner product hose; an outer hose coaxially surrounding the product hose to define therewith an annular vapor passageway therebetween; a suction tube located within the passageway and connected at one end to a suction means, the other end thereof being located at a low point of the catenary of the hose assembly while in use; a cradle-shaped hose rotation restrainer attached to the product hose at the low point; and means for attaching the restrainer and the suction tube to the low point of the product hose.

BRIEF DESCRIPTION OF THE DRAWINGS

FIG. 1 illustrates a typical coaxial vapor recovery hose assembly, showing in phantom the inner product hose having attached thereto the hose rotation restrainer of the present invention.

FIG. 2 is a perspective view of the hose rotation restrainer, of the instant invention.

FIG. 3 is an exploded view, partly in section, of the low point in the catenary of the hose assembly of the encircled area denoted by numeral 3 in FIG. 1.

DETAILED DESCRIPTION OF THE INVENTION

FIG. 1 illustrates a coaxial hose assembly denoted generally as 10 which is connected between a pump stand 12 and a product dispensing nozzle 14. The hose assembly comprises an inner product hose 16, having an outer radius and an outer diameter. Coaxially surrounding the product hose 16 is the outer hose 18 which, with the product hose 16, defines an annular vapor passageway 20 therebetween. In operation, the inner product hose 16 conducts the fuel from the pump stand 12 through the product nozzle 14 into a motor vehicle fuel tank. Vapors being displaced from the motor vehicle fuel tank are returned through the dispensing nozzle 14 through the vapor passageway 20 back to the pump stand 12. Should the vapors condense or should a splashback from the vehicle fuel tank occur, the liquid would accumulate in the low point of the catenary 3 of the hose assembly. In order to keep the annular vapor passageway 20 clear of liquid accumulation, it is necessary to suck the liquid out of the low point in the catenary 3 by means of a suction tube 26 whose inlet end is located at the low point of the catenary 3 and whose other end is connected to a suction means (not shown). In order to prevent the rotation of the inner product hose 16 and to retain the inlet end to the suction tube 26 on the bottom of the product hose 16, there is provided a hose rotation restrainer 22 which is attached to the inner product hose 16 by attaching means 24, preferably in the form of what is commonly known as cable ties.

The cradle-shaped hose rotation restrainer comprises a pair of arcuate, parallel members 21 having inwardly extending loops 23 at each end of the members and connected at each end thereof by a semicircular loop 22a, 22b having a radius equal to the outer radius of the product hose wherein the members are spaced apart a distance equal to the outer diameter of the product hose. While it is preferred that the hose rotation restrainer be formed of one continuous piece of material, as illustrated, for simplicity of manufacture, it can be appreciated that the restrainer can be formed from a plurality of individual components.

It is preferred that the hose rotation restrainer be made of metallic wire such as piano wire or spring wire which is bent to the shape illustrated in FIG. 2, but it is also contemplated that the hose rotation restrainer could be formed in a molding operation using a material such as a thermoplastic. The only criteria for the material is that it be sufficiently rigid to retain the arcuate shape when no tension is exerted on the hose assembly, yet be flexible enough to straighten out when a tension is exerted on the hose assembly.

In operation, the hose rotation restrainer 22 and the suction tube 26 are attached to the bottom of the product hose 16 by attaching means 24 such that the suction tube 26 is located on the bottom of the product hose 16 at the low point in the catenary 3 of the coaxial vapor recovery hose assembly. This allows the suction means to draw any accumulated liquid out of the vapor passageway 20 in order to allow the vapors to return from the vehicle fuel tank to the pump stand.

While certain representative embodiments have been shown for the purpose of illustrating the present invention, it will be apparent to those skilled in the art that various changes and modifications may be made therein without departing from the spirit or scope of the invention.

I claim:

1. In a coaxial vapor recovery hose assembly having an inner product hose having an outer radius and an outer diameter, an outer hose coaxially surrounding said product hose and defining therewith an annular vapor passageway therebetween and a suction tube which extends to a low point of a catenary of the hose assembly where a liquid would accumulate while in use, a cradle-shaped hose rotation restrainer, attached to said product hose at said low point and comprising a pair of arcuate, parallel members connected at each end thereof by semicircular loops having a radius equal to the outer radius of the product hose, said members being spaced apart a distance equal to the outer diameter of the product hose.

2. The restrainer according to claim 1 wherein said members and said loops are formed from a continuous piece of material.

3. The restrainer according to claim 1 wherein it is formed of a material which is rigid enough to retain the arcuate shape of the restrainer when no tension is exerted on the hose assembly, yet flexible enough to straighten out when tension is exerted on the hose assembly.

4. A coaxial vapor recovery hose assembly comprising an inner product hose having an outer radius and an outer diameter; an outer hose coaxially surrounding said product hose and defining therewith an annular vapor passageway therebetween; a suction tube located within said passageway and connected at one end to a suction means, the other end thereof being located at a low point of a catenary of said hose assembly where a liquid would accumulate while in use; a cradle-shaped hose rotation restrainer attached to said product hose at said low point and comprising a pair of arcuate, parallel members connected at each end thereof by a semicircular loop having a radius equal to said product hose radius, said members being spaced apart a distance equal to said product hose diameter; and means for attaching said restrainer and said suction tube to said low point of the product hose.

* * * * *